(12) United States Patent
Swenson et al.

(10) Patent No.: US 8,035,507 B2
(45) Date of Patent: Oct. 11, 2011

(54) METHOD AND APPARATUS FOR STIMULATING POWER LINE CARRIER INJECTION WITH REACTIVE OSCILLATION

(75) Inventors: Chad Nicholas Swenson, Mandan, ND (US); Jesse Jon Walter, Crystal, MN (US); Kevin Charles Allmaras, Carrington, ND (US); Brian Frederick Boeshans, Carrington, ND (US)

(73) Assignee: Cooper Technologies Company, Houston, TX (US)

( * ) Notice: Subject to any disclaimer, the term of this patent is extended or adjusted under 35 U.S.C. 154(b) by 542 days.

(21) Appl. No.: 12/259,859

(22) Filed: Oct. 28, 2008

(65) Prior Publication Data

US 2010/0102937 A1    Apr. 29, 2010

(51) Int. Cl.
G08B 1/08 (2006.01)
H04M 11/04 (2006.01)
H04Q 1/30 (2006.01)

(52) U.S. Cl. ................................ 340/538; 455/127.1
(58) Field of Classification Search .................. 340/538; 332/123; 455/127.1, 125
See application file for complete search history.

(56) References Cited

U.S. PATENT DOCUMENTS

| | | |
|---|---|---|
| 2,342,787 A | 2/1944 | Brown |
| 2,883,459 A | 4/1959 | Roy |
| 2,936,367 A | 5/1960 | Kobetich et al. |
| 3,495,217 A | 2/1970 | Brooks |
| 4,204,194 A | 5/1980 | Bogacki |
| 4,270,206 A | 5/1981 | Hughes |
| 4,323,882 A | 4/1982 | Gajjar |
| 4,355,303 A | 10/1982 | Phillips et al. |
| 4,399,547 A | 8/1983 | Moore et al. |
| 4,451,853 A | 5/1984 | Moriguchi et al. |
| 4,746,897 A | 5/1988 | Shuey |
| 5,005,187 A | 4/1991 | Thompson |
| 5,241,283 A | 8/1993 | Sutterlin |
| 5,349,644 A | 9/1994 | Massey et al. |
| 5,475,360 A | 12/1995 | Guidette et al. |
| 5,519,622 A | 5/1996 | Chasek |
| 5,570,085 A | 10/1996 | Bertsch |
| 5,585,777 A | 12/1996 | Johnson et al. |
| 5,610,552 A | 3/1997 | Schlesinger et al. |
| 5,694,108 A | 12/1997 | Shuey |
| 5,731,745 A * | 3/1998 | Parham ........................ 332/123 |

(Continued)

OTHER PUBLICATIONS

International Search Report, Mailed Sep. 21, 2010, for Related PCT Application No. PCT/US2010/043819, 2 pages.

*Primary Examiner* — John A Tweel, Jr.
(74) *Attorney, Agent, or Firm* — King & Spalding LLP

(57) ABSTRACT

Stimulating power line carrier injection with reactive oscillation comprises exciting a tank circuit to oscillate at the carrier frequency by sinking pulses of current between one node of a capacitor in the tank circuit and the other node of the capacitor. A power transformer is connected to a distribution system to inject a power line carrier onto the power line. An excitation circuit sinks short pulses of current between one node of a capacitor and the other node of the capacitor that is connected in a tank circuit arrangement with an inductor and the secondary winding of the power transformer. The tank circuit oscillates at the frequency of the excitation pulses if the resonant frequency of the tank circuit is close to the frequency of excitation. The oscillating current is coupled onto the power line system through the power transformer. The phase of the power line carrier signal is shifted by shifting the phase of the excitation pulses.

13 Claims, 2 Drawing Sheets

U.S. PATENT DOCUMENTS

| | | | |
|---|---|---|---|
| 5,818,821 A | 10/1998 | Schurig | |
| 5,842,032 A | 11/1998 | Bertsch | |
| 5,842,977 A * | 12/1998 | Lesho et al. | 600/300 |
| 5,933,073 A | 8/1999 | Shuey | |
| 5,938,757 A | 8/1999 | Bertsch | |
| 5,970,127 A | 10/1999 | Smith et al. | |
| 5,978,371 A | 11/1999 | Mason, Jr. et al. | |
| 6,055,435 A | 4/2000 | Smith et al. | |
| 6,107,912 A | 8/2000 | Bullock et al. | |
| 6,122,492 A * | 9/2000 | Sears | 455/127.1 |
| 6,243,571 B1 | 6/2001 | Bullock et al. | |
| 6,246,868 B1 | 6/2001 | Bullock et al. | |
| 6,275,922 B1 | 8/2001 | Bertsch | |
| 6,357,243 B1 | 3/2002 | Efron et al. | |
| 6,831,551 B2 | 12/2004 | Davenport et al. | |
| 6,933,835 B2 | 8/2005 | Kline | |
| 6,950,567 B2 | 9/2005 | Kline | |
| 6,958,680 B2 | 10/2005 | Kline | |
| 6,965,302 B2 | 11/2005 | Mollenkopf et al. | |
| 6,965,303 B2 | 11/2005 | Mollenkopf | |
| 6,977,578 B2 | 12/2005 | Kline | |
| 6,980,089 B1 | 12/2005 | Kline | |
| 6,980,090 B2 | 12/2005 | Mollenkopf | |
| 6,980,091 B2 | 12/2005 | White, II et al. | |
| 6,982,611 B2 | 1/2006 | Cope | |
| 6,998,962 B2 | 2/2006 | Cope et al. | |
| 7,042,351 B2 | 5/2006 | Kline | |
| 7,046,124 B2 | 5/2006 | Cope et al. | |
| 7,053,756 B2 | 5/2006 | Mollenkopf et al. | |
| 7,064,654 B2 | 6/2006 | Berkman et al. | |
| 7,069,091 B2 | 6/2006 | Williamson | |
| 7,075,414 B2 | 7/2006 | Giannini et al. | |
| 7,076,378 B1 | 7/2006 | Huebner | |
| 7,102,478 B2 | 9/2006 | Pridmore, Jr. et al. | |
| 7,103,240 B2 | 9/2006 | Kline | |
| 7,113,134 B1 | 9/2006 | Berkman | |
| 7,129,872 B1 | 10/2006 | Qvortrup et al. | |
| 7,132,819 B1 | 11/2006 | Cope et al. | |
| 7,151,968 B2 | 12/2006 | Williamson | |
| 7,170,394 B2 | 1/2007 | Chandler et al. | |
| 7,199,699 B1 | 4/2007 | Gidge | |
| 7,218,219 B2 | 5/2007 | Kline | |
| 7,221,702 B2 | 5/2007 | Olson et al. | |
| 7,224,243 B2 | 5/2007 | Cope | |
| 7,245,201 B1 | 7/2007 | Kline et al. | |
| 7,245,212 B2 | 7/2007 | Cope et al. | |
| 7,245,472 B2 | 7/2007 | Davidow | |
| 7,248,148 B2 | 7/2007 | Kline et al. | |
| 7,250,848 B2 | 7/2007 | White, II | |
| 7,301,440 B2 | 11/2007 | Mollenkopf | |
| 7,307,511 B2 | 12/2007 | Kline | |
| 7,307,512 B2 | 12/2007 | Yaney et al. | |
| 7,308,103 B2 | 12/2007 | Corcoran et al. | |
| RE40,620 E * | 1/2009 | Elder et al. | 455/121 |
| 7,528,503 B2 | 5/2009 | Rognli et al. | |
| 2007/0299562 A1 | 12/2007 | Kates | |
| 2008/0255782 A1 | 10/2008 | Bilac et al. | |
| 2010/0102937 A1 | 4/2010 | Swenson et al. | |

* cited by examiner

METHOD AND APPARATUS FOR STIMULATING POWER LINE CARRIER INJECTION WITH REACTIVE OSCILLATION

TECHNICAL FIELD

The present invention relates generally to the field of power line carrier communications, and more particularly to methods and systems for stimulating power line carrier injection with reactive oscillation.

BACKGROUND

Injecting power line carrier signals onto power lines for the purpose of communicating digital data from one location to another is used in the field of power distribution. Typically, a power line carrier signal is generated by supplying a sinusoidal signal at the input of an amplifier. The signal is amplified and then injected onto the power line by injecting it into the secondary winding of a power transformer that is connected to the power line or injecting it directly onto the power line through high voltage capacitors. In the case of the transformer type injection, the signal that is injected into the secondary winding of the transformer induces a signal on the primary winding of the transformer which is connected to the power line. Digital data is communicated by modulating the phase of the carrier signal that is induced onto the power line.

For conventional power line carrier infrastructure, large capacitors may be used to couple the carrier signal onto the distribution lines. These large capacitors can be a safety concern as they are at distribution line potential (7.5 to 25 kV) and can store an electrical charge for a long period of time.

Another disadvantage of conventional power line carrier injecting systems is the complexity of the circuitry in such systems. The complexity of the circuitry can lead to higher manufacturing and maintenance costs.

Accordingly, a need exists within the art for a power line carrier injection device that can reduce or eliminate the use of large coupling capacitors and/or complex circuitry, that can increase the safety of the device, and/or that can allow for the device to be installed in a smaller enclosure.

SUMMARY

The present invention can make it possible to stimulate power line carrier signals without a large power supply or large capacitor to couple the carrier signal onto the power line. The present invention utilizes short pulses of current to excite a tank circuit and therefore force the tank circuit to oscillate at the frequency of excitation, which can be near the natural resonant frequency of the tank circuit. This process allows the carrier signal to be coupled onto the distribution lines through the power transformer.

In one aspect of the present invention, a power transformer is connected to a distribution system to provide power to a circuit and to allow a stimulated power line carrier signal to be coupled onto the distribution system. An excitation circuit sinks short pulses of current between a first node of a capacitor and a second node of a capacitor that is connected in a tank circuit arrangement with an inductor and the secondary winding of the power transformer. The tank circuit oscillates at the frequency of the excitation pulses when pulses of current are sunk at a frequency close to the resonant frequency of the tank circuit. The oscillating current is coupled onto the power line system through the power transformer. The phase of the power line carrier is shifted by shifting the phase of the excitation pulses.

In another aspect of the present invention, a current sensor measures current flowing through a field effect transistor (FET) that is included in the excitation circuit. A FET control circuit controls the amount of current flowing through the FET by adjusting the voltage at a gate node of the FET.

These and other aspects, objects, features, and embodiments of the present invention will become apparent to those having ordinary skill in the art upon consideration of the following detailed description of illustrative embodiments exemplifying the best mode for carrying out the invention as presently perceived.

DETAILED DESCRIPTION OF EXEMPLARY EMBODIMENTS

The present invention provides methods and systems for stimulating power line carrier injection. Specifically, the invention provides methods and systems for stimulating power line carrier injection using reactive oscillation. This method can reduce or eliminate the need for large coupling capacitors and/or complex circuitry.

Turning now to the drawings, in which like numerals indicate like elements throughout the figures, exemplary embodiments of the invention are described in detail.

Figure 1:
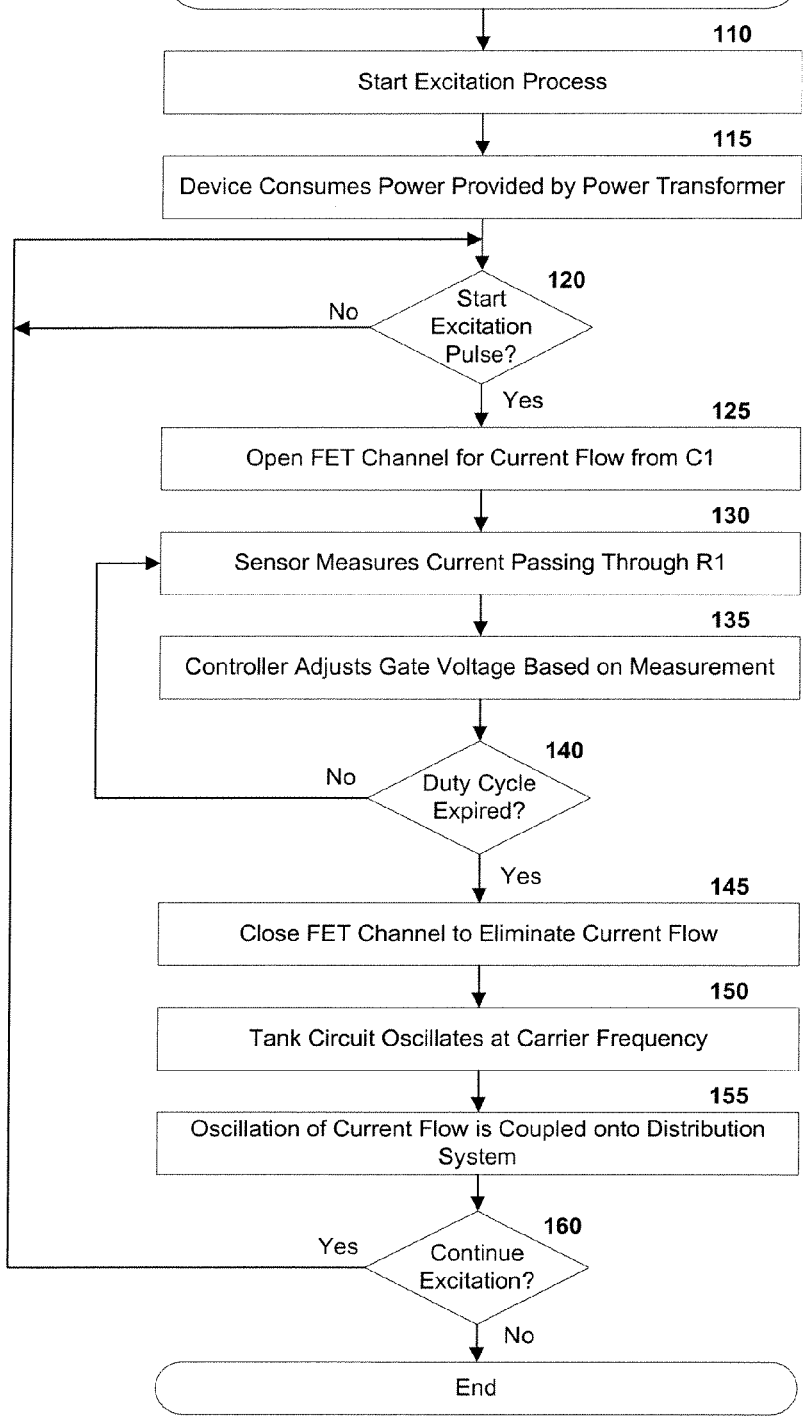
FIG. 1 is a functional block diagram illustrating a method for stimulating power line carrier injection with reactive oscillation according to an exemplary embodiment of the present invention.

FIG. 1 illustrates a method 100 for stimulating power line carrier injection with reactive oscillation according to an exemplary embodiment of the present invention. FIG. 1 will be described with reference to FIG. 2, which illustrates a circuit 200 for stimulating power line carrier injection with reactive oscillation according to an exemplary embodiment of the present invention.

Step 110 begins the excitation process.

In step 115, a power transformer T1 connected to a distribution system (not shown) serves to provide power to a power line carrier stimulating device 230 and to couple a carrier signal to the distribution system. The power transformer T1 has a primary winding L3 and a secondary winding L1. The primary winding L3 of the power transformer T1 is connected across a single phase of the power line system and the neutral line of the power line system such that an AC voltage is developed across the primary winding L3. Although this exemplary embodiment is described with reference to a single phase of the power line system, poly-phase configurations also are possible using the method described herein.

In a typical application, the power transformer T1 steps the primary voltage V1 on the primary winding L3 down to a lower voltage V2 on the secondary winding L1, or alternatively, the power transformer T1 steps the secondary voltage V2 on the secondary winding L1 up to the voltage V1 on the primary winding L3. For example, the primary voltage V1 may be greater than 1 Kilovolt (KV) and the secondary voltage V2 may be 240 Volts (V).

In step 120, with power provided to the power line carrier stimulating device 230, the device may begin generating excitation pulses.

Figure 2:
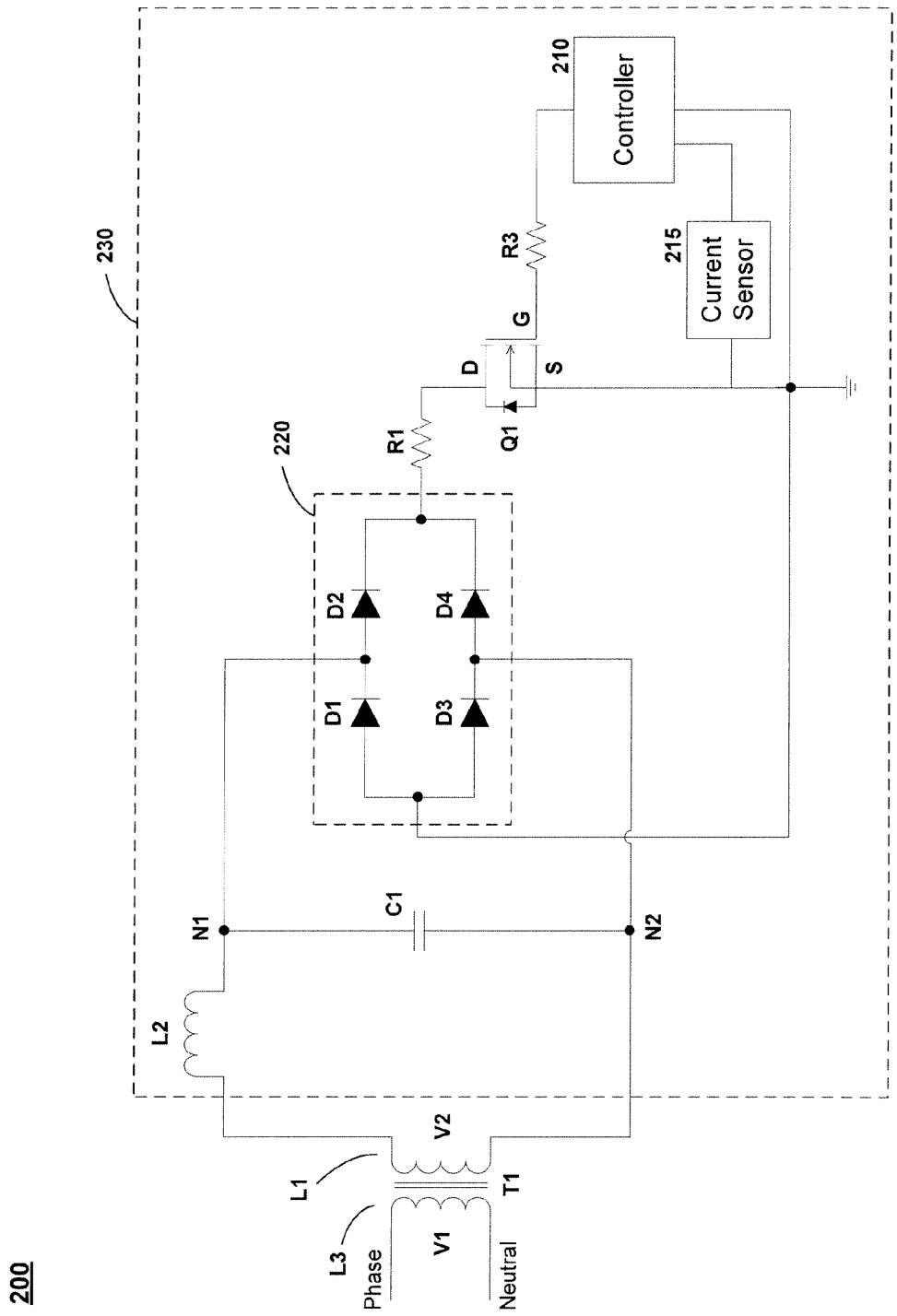
FIG. 2 is a schematic illustration of a circuit for stimulating power line carrier injection with reactive oscillation according to an exemplary embodiment of the present invention.

To inject power line carrier signals onto the distribution system, a tank circuit, is forced to oscillate. The tank circuit comprises the secondary winding L1, an inductor L2, and a capacitor C1. One method of exciting the tank circuit and therefore forcing the tank circuit to oscillate is to sink short pulses of current between one node of the capacitor C1 and the other node of the capacitor C1. The capacitor nodes are represented in FIG. 2 by nodes N1 and N2. If the resonant frequency of the tank circuit is relatively close (within a few kHz) to the frequency of the excitation, the tank circuit will oscillate at the frequency of the excitation pulses. Also, changing the phase of the excitation pulses will cause the same phase change in the oscillations of the tank circuit. This process allows many types of Phase Shift Keying to be possible.

An excitation circuit is utilized to sink short pulses of current between nodes N1 and node N2. In this exemplary embodiment, the excitation circuit includes a FET Q1, a controller 210, two resistors R1 and R3, a full wave rectifier 220, and a current sensor 215 configured as depicted in FIG. 2. Alternative exemplary embodiments may include multiple FETs and other components to refine the power line carrier signal.

In step 125, the channel between the source S and drain D of the FET Q1 is opened to sink pulses of current between node N1 and node N2. This task is accomplished by applying a suitable voltage to the gate G of the FET Q1 to open the channel. The level of voltage required depends upon the FET chosen and the other components included in the circuit. In one exemplary embodiment, the voltage is supplied by a microcontroller included in the controller 210. The controller determines the correct voltage to apply to the gate G of the FET Q1 based on the current sensor feedback. In an exemplary embodiment, the microcontroller can apply voltage to and remove voltage from the gate G of the FET repeatedly at a specified frequency, similar to a square wave.

After the channel between the source S and the drain D of the FET Q1 is opened, the electrical charge stored in the capacitor C1 will discharge through the excitation circuit. As discussed previously, the exemplary excitation circuit comprises the Field Effect Transistor (FET) Q1, the controller 210, two resistors R1 and R3, the full wave rectifier 220, and the current sensor 215 configured as depicted in FIG. 2. The rectifier circuit 220 is connected between nodes N1 and N2 to allow current to flow through the FET Q1 regardless of the polarity of the power line voltage. If the voltage at N1 is greater than the voltage at node N2, current will flow from the node of the capacitor C1 connected to node N1 through diode D2, resistor R1, the drain D of FET Q1, the source S of FET Q1, and finally through diode D3 to reach node N2. If the voltage at N2 is greater than the voltage at node N1, current will flow from the node of the capacitor C1 connected to node N2 through diode D4, resistor R1, the drain D of FET Q1, the source S of FET Q1, and finally through diode D1 to reach node N1.

In an exemplary embodiment, the channel is held open for less than 50% of the period of the desired power line carrier frequency. The amplitude of the output signal can vary with a change in the pulse width, or duty cycle. For a duty cycle of up to about 50% of the period of the carrier frequency, the amplitude increases with an increase in duty cycle. The amplitude of the output signal tends to decrease with an increase of duty cycle above approximately 50% of the carrier frequency.

In the exemplary embodiment illustrated in FIG. 2, the resistor R1 can be included in the circuit between the rectifier 220 and the drain D of the FET Q1 to dissipate some of the power that is flowing through the excitation circuit. If a higher resistance of R1 is chosen, the resistor R1 will dissipate more power and decrease the power requirements of the FET Q1. A lower resistance of R1 allows for greater output power but would require a higher power requirement of the FET Q1.

In step 130, a current sensor 215 measures the current flowing through the source S and drain D of the FET Q1. In one exemplary embodiment, the current sensor 215 includes a low resistance resistor (for example, approximately 50 mΩ) connected between the source S of the FET Q1 and ground. Then, the voltage across the resistor can be amplified and compared to a reference voltage in the controller 210 to determine if the amount of current flowing through the source S and drain D of the FET Q1 is at a desired level.

In step 135, the controller 210 adjusts the level of current flowing through the source S and drain D of the FET Q1 based on the current measurement obtained in step 130. In an exemplary embodiment, the controller 210 includes a FET control circuit (not shown) that adjusts the current flowing through the FET Q1 by adjusting the voltage at the gate G of the FET Q1. The level of voltage at the gate G of the FET Q1 can control the size of the channel between the source S and drain D of the FET Q1, thus allowing more or less current to flow through the channel. A typical FET control circuit includes an operational amplifier, resistors to set the gain of the operational amplifier, and one or more capacitors to filter the output signal.

The use of a FET control circuit and the current sensor 215 allows the controller 210 to maintain a constant current flow through the source S and drain D of the FET Q1. This method prevents damage to the device by reducing current through Q1 and also serves to provide more consistent carrier output. Alternatively, a voltage divider network can be employed at the gate G of the FET Q1 to maintain a consistent voltage level at the gate G of the FET Q1. This method may not provide a consistent current flow through the source S and drain D of the FET Q1 but will still excite the tank circuit.

In step 140, if the duty cycle has not expired, the method returns to step 130 to measure the current flowing through the FET Q1. If the duty cycle has expired, the method proceeds to step 145.

In step 145, the channel between the source and drain of FET Q1 is closed by removing or reducing the voltage at the gate G of the FET Q1.

In step 150, the excitation pulse generated in step 125 causes the tank circuit to oscillate at the frequency of the excitation pulses. The tank circuit includes the secondary winding L1 of the power transformer T1, the inductor L2, and the capacitor C1. As discussed above, the resonant frequency of the tank circuit can be close to the frequency of the carrier signal. The resonant frequency (f) for the tank circuit in FIG. 2 is calculated using formula [1] below, where L is the combined inductance of L1 and L2 in Henries and C is the capacitance of C1 in Farads.

$$f = \frac{1}{2\pi\sqrt{LC}} \quad [1]$$

The capacitor C1 and the inductor L2 values are chosen to give the resulting tank circuit a resonant frequency that is close to the power line carrier frequency. In an exemplary embodiment, the capacitor C1 and the inductor L2 can be onboard and/or within the enclosure of the power line carrier generation device that contains the excitation circuit. In certain exemplary embodiments, more than one inductor and more than one capacitor may be used in the tank circuit. Other components can be utilized in the tank circuit as well.

When the voltage across the capacitor C1 differs from the voltage across the secondary winding of the transformer T1 (usually due to the excitation pulses), the capacitor C1 begins to recharge by sinking current out of the transformer T1 through the inductor L2. When the voltage across the capacitor C1 reaches the voltage of the secondary winding of the transformer T1, the inductance in the secondary winding of the transformer T2 and the inductor L2 force the capacitor C1 to overcharge to a voltage greater than the voltage across the secondary winding of the transformer T2. This process is responsible for the oscillatory behavior of the device.

In step 155, the oscillation of current flows through the secondary winding L1 of the power transformer T1 and couples the carrier signal onto the primary side of the power transformer and thus onto the distribution system.

In step 160, until it is desired to stop injecting power line carrier signals onto the power line system, the method 100 returns to step 120 and continues sinking pulses of current between one node of capacitor C1 and the other node of capacitor C1 to oscillate the tank circuit and to induce power line carrier signals onto the distribution system.

Although the functional block diagram 100 illustrates steps 125-145 occurring after step 115 and before steps 150 and 155, steps 125-145, step 115, and steps 150 and 155 are typically executing in parallel after steps 125-145 have executed for the first time. Accordingly, these steps may be performed simultaneously or in an alternative order.

Without any additional pulses of current, the tank circuit would oscillate at the resonant frequency of the tank circuit until the overall resistance of the tank circuit causes the oscillation of current to decay. When pulses of current are sunk at or near the resonant frequency of the tank circuit, each pulse builds on the previous pulses to maintain the oscillation of current. For example, the second pulse of current builds on the second oscillation caused by the first pulse of current.

Phase Shift Keying can be accomplished by adjusting the phase of the excitation pulses. In an exemplary application, the frequency of the power line carrier, and therefore the frequency that the excitation pulses should be applied is 12.5 kHz. The period of a 12.5 kHz signal is 80 microseconds (μs). A 180° phase shift can be accomplished by either shortening the period between one pulse and the next pulse from 80 μs to 40 μs or by lengthening the period between one pulse and the next pulse from 80 μs to 120 μs.

One of ordinary skill in the art will appreciate that the present invention provides methods and systems for stimulating power line carrier injection. Specifically, the invention provides methods and systems for stimulating power line carrier injection using reactive oscillation. This method can eliminate or reduce the need for a large coupling capacitor and/or complex circuitry. Many other modifications, features, and embodiments of the invention will become evident to those having ordinary skill in the art. It should be appreciated, therefore, that many aspects of the invention were described above by way of example only and are not intended as required or essential elements of the invention unless explicitly stated otherwise. Accordingly, it should be understood that the foregoing description relates only to certain exemplary embodiments of the invention and that numerous changes may be made therein without departing from the spirit and scope of the invention as defined by the following claims. It should also be understood that the invention is not restricted to the illustrated embodiments and that the various modifications can be made within the scope of the following claims.

What is claimed is:

1. A method for coupling a carrier signal onto a distribution system, comprising the steps of:
providing power to a secondary winding of a power transformer from a distribution system that is connected to a primary winding of the power transformer;
exciting a tank circuit to oscillate current at a frequency;
forcing the oscillating current through the secondary winding of the power transformer; and
coupling the oscillating current from the secondary winding of the power transformer to the primary winding of the power transformer.

2. The method of claim 1, wherein the step of exciting a tank circuit to oscillate current comprises sinking pulses of current at the frequency between a first node of a capacitor in the tank circuit and a second node of the capacitor.

3. The method of claim 2, further comprising the steps of:
measuring the amount of current flowing between the first node of the capacitor and the second node of the capacitor; and
adjusting the amount of current flowing between the first node of the capacitor and the second node of the capacitor in response to the measurement of the current that is flowing between the first node of the capacitor and the second node of the capacitor.

4. The method of claim 1, further comprising the step of:
changing the phase of the oscillating current produced by exciting the tank circuit to change the phase of the oscillating current that is coupled from the secondary winding of the power transformer to the primary winding of the power transformer.

5. A circuit for coupling a carrier signal onto a distribution system, comprising:
a tank circuit that oscillates current at a frequency when pulses of current are sunk on the tank circuit at the frequency; and
an excitation circuit that sinks the pulses of current on the tank circuit at the frequency.

6. The circuit of claim 5, wherein the tank circuit comprises an inductor connected between a capacitor and a secondary winding of a power transformer connected to the distribution system.

7. The circuit of claim 6, wherein the capacitor comprises a first node and a second node, and wherein the pulses of current are sunk on the tank circuit by being sunk between the first node of the capacitor and the second node of the capacitor.

8. The circuit of claim 5, further comprising a power transformer comprising a primary winding and a secondary winding, the secondary winding being connected to the tank circuit, wherein the tank circuit forces the oscillating current from the secondary winding to the primary winding.

9. The circuit of claim 5, wherein the excitation circuit comprises a field effect transistor that comprises a source node, a drain node, and a gate node.

10. The circuit of claim 9, wherein the excitation circuit comprises a microcontroller that repeatedly applies and removes a voltage to the gate node of the field effect transistor at the frequency to open and close a channel between the source node of the field effect transistor and the drain node of the field effect transistor at the frequency.

11. The circuit of claim 9, further comprising:
a current sensor that measures a current flow through the field effect transistor; and
a field effect transistor control circuit that controls the current through the field effect transistor.

12. The circuit of claim 11, wherein the field effect transistor control circuit comprises an operational amplifier.

13. The circuit of claim 5, wherein the excitation circuit comprises a rectifier.

* * * * *